United States Patent [19]
Van Dÿk

[11] Patent Number: 5,660,766
[45] Date of Patent: Aug. 26, 1997

[54] AERATOR

[76] Inventor: Bernhard Van Dÿk, 5682 Gilpin Street, Burnaby, British Columbia, Canada, V5H 2H9

[21] Appl. No.: 532,493

[22] Filed: Sep. 22, 1995

[51] Int. Cl.[6] ................................................ B01F 3/04
[52] U.S. Cl. ............................................................ 261/87
[58] Field of Search ................................................ 261/87

[56] References Cited

U.S. PATENT DOCUMENTS

| | | | |
|---|---|---|---|
| 1,726,125 | 8/1929 | Rowand | 261/87 |
| 2,609,189 | 9/1952 | Dering | 261/87 |
| 3,796,417 | 3/1974 | Kaelin | 261/93 |
| 3,864,438 | 2/1975 | Nagahama | 261/87 |
| 3,875,279 | 4/1975 | Kaelin | 261/91 |
| 4,018,859 | 4/1977 | Muller | 261/87 |
| 4,283,357 | 8/1981 | Sidery | 261/87 |
| 5,013,490 | 5/1991 | Tanimoto et al. | 261/87 |

FOREIGN PATENT DOCUMENTS

| | | | |
|---|---|---|---|
| 109577 | 1/1940 | Australia | 261/87 |
| 1101138 | 5/1981 | Canada. | |
| 2054044 | 10/1994 | Canada. | |
| 1474582 | 2/1967 | France | 261/87 |
| 1189952 | 4/1965 | Germany | 261/87 |

Primary Examiner—Tim R. Miles
Attorney, Agent, or Firm—Merchant, Gould, Smith, Edell, Welter & Schmidt, P.A.

[57] ABSTRACT

An aerator for introducing and dispersing air as fine bubbles in a liquid-solid slurry has a lower body, an upper body and replaceable blades affixed between the upper and lower bodies. The blades have a body portion positioned between the upper and lower bodies and a projecting portion extending radially outwards. The upper body has a vertical axial bore which is connected to an air tube open to the atmosphere. As the aerator is rotated by rotation of the air tube, air is drawn through the air tube into the body of the aerator and is dispersed out through air exit ports between the blades into the slurry, without intake of slurry into the aerator.

10 Claims, 4 Drawing Sheets

AERATOR

FIELD OF THE INVENTION

The invention pertains to a device for introducing and dispersing gas as fine bubbles in a fluid. More specifically, it relates to an aerator for use in aerating liquid-solid organic waste mixtures in order to accelerate the decomposition of the organic matter.

BACKGROUND OF THE INVENTION

Decomposition of organic matter, such as vegetable wastes and sewage, can be effected by introducing suitable bacteria into a tank containing a slurry of the organic matter in water, while aerating and mixing the slurry. Thorough aeration of the slurry, in the form of fine air bubbles dispersed throughout the slurry, accelerates such decomposition by providing ample oxygen to the bacteria.

Slurries of organic matter typically contain solid matter, namely the organic matter itself or trash such as wrapping materials, which are frequently made of plastic, that accompany the waste. To prevent blockages within the aerator, it is important that it function in a manner which does not draw the slurry into the aerator during the aeration process. It is also desirable for the aerator to draw sufficient air into itself for aeration of the slurry by the simple rotation of the aerator, without the need for any external pump to supply air to the aerator. It is also desirable for the aerator to disperse the drawn air into the slurry as fine bubbles. A need therefore exists for an improved aerator for use in aerating waste slurries.

SUMMARY OF THE INVENTION

According to one aspect of the invention, there is provided an aerator to be submerged in a liquid-solid slurry for introducing and dispersing air as fine bubbles in the slurry. The aerator has a lower body, an upper body and a plurality of blades disposed between the upper and lower bodies. The lower and upper bodies are generally circular in horizontal cross-section and are rotatable, together with the blades, about a vertical axis. The blades are spaced apart from each other and have a portion which projects outwardly and rearwardly with respect to the intended direction of rotation of the aerator. The upper body has an axial bore to engage with an air conduit which is open to the atmosphere at its intake end. The axial bore interconnects with spaces between the blades which form air exit conduits. The aerator is submerged in a liquid-solid slurry and is rotated by means of rotating the air conduit. This causes air to be drawn through to the air conduit into the aerator and ejected as fine bubbles into the slurry, without intake of the slurry into the air exit conduits.

According to a preferred embodiment of the invention, the blades are removable and replaceable. They include a body portion which is positioned between the upper and lower bodies of the aerator. Preferably, the upper body of the aerator is in the shape of an inverted, truncated cone.

DETAILED DESCRIPTION OF THE PREFERRED EMBODIMENT

Figure 1:
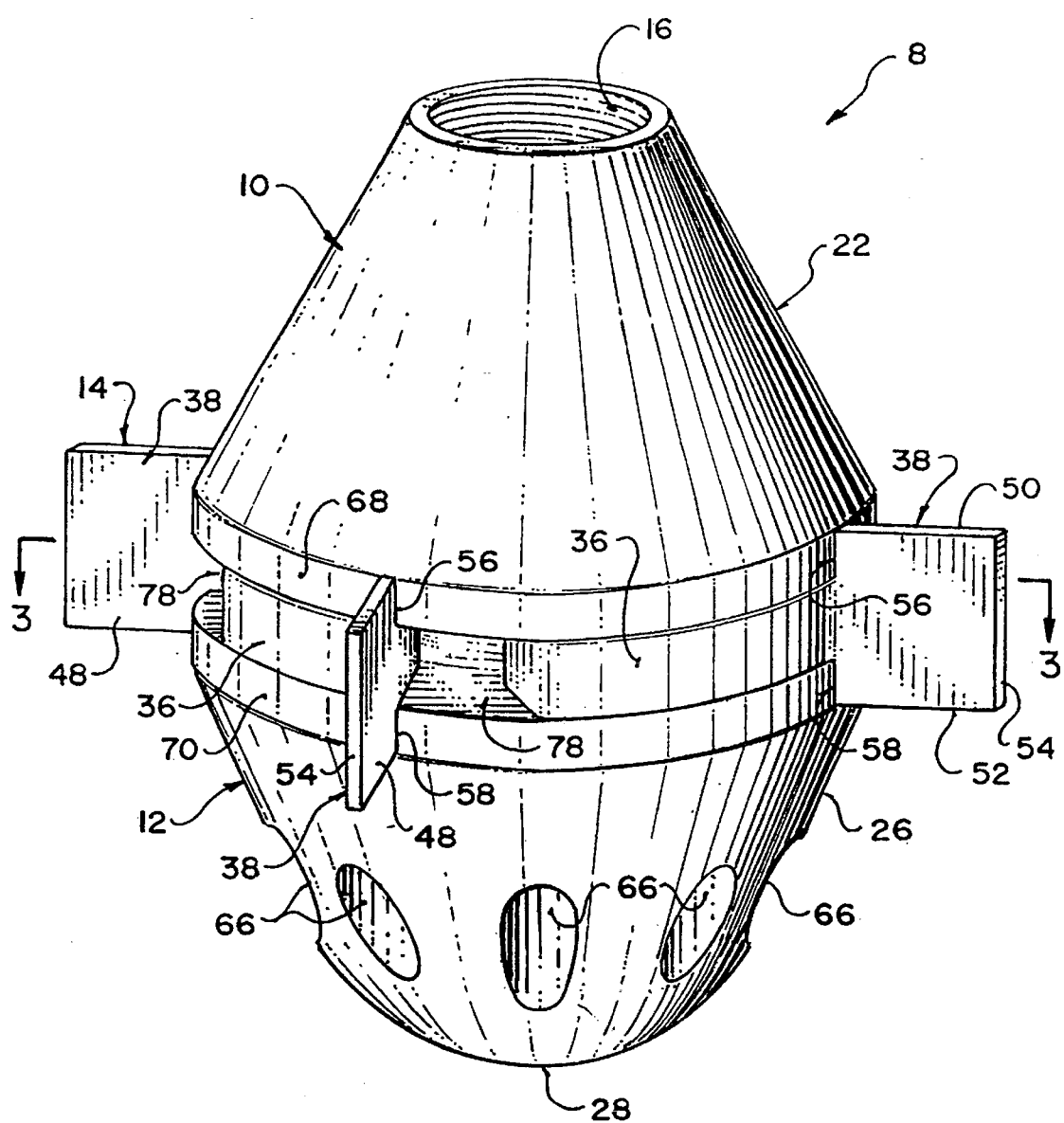
FIG. 1 is a perspective view of the aerator according to the invention.

Referring to FIG. 1, the preferred embodiment of the aerator 8 has an upper body 10, lower body 12 and a set of replaceable blades 14. The upper body 10, lower body 12 and blades 14 are fastened rigidly together as a unit by means of bolts 80, as described below.

The upper body 10 has the external shape generally of an inverted, truncated cone. It is radially symmetrical about its vertical axis. It has an outer wall 22 and circumferential rim 68 at its lower edge. Axial bore 16 opens at the upper end of the upper body 10 and is threaded to receive and securely engage a threaded air tube 74 (shown in cross-section in FIG. 4) which conducts air into the aerator. The air tube 74 is preferably a rigid metal tube.

Figure 4:
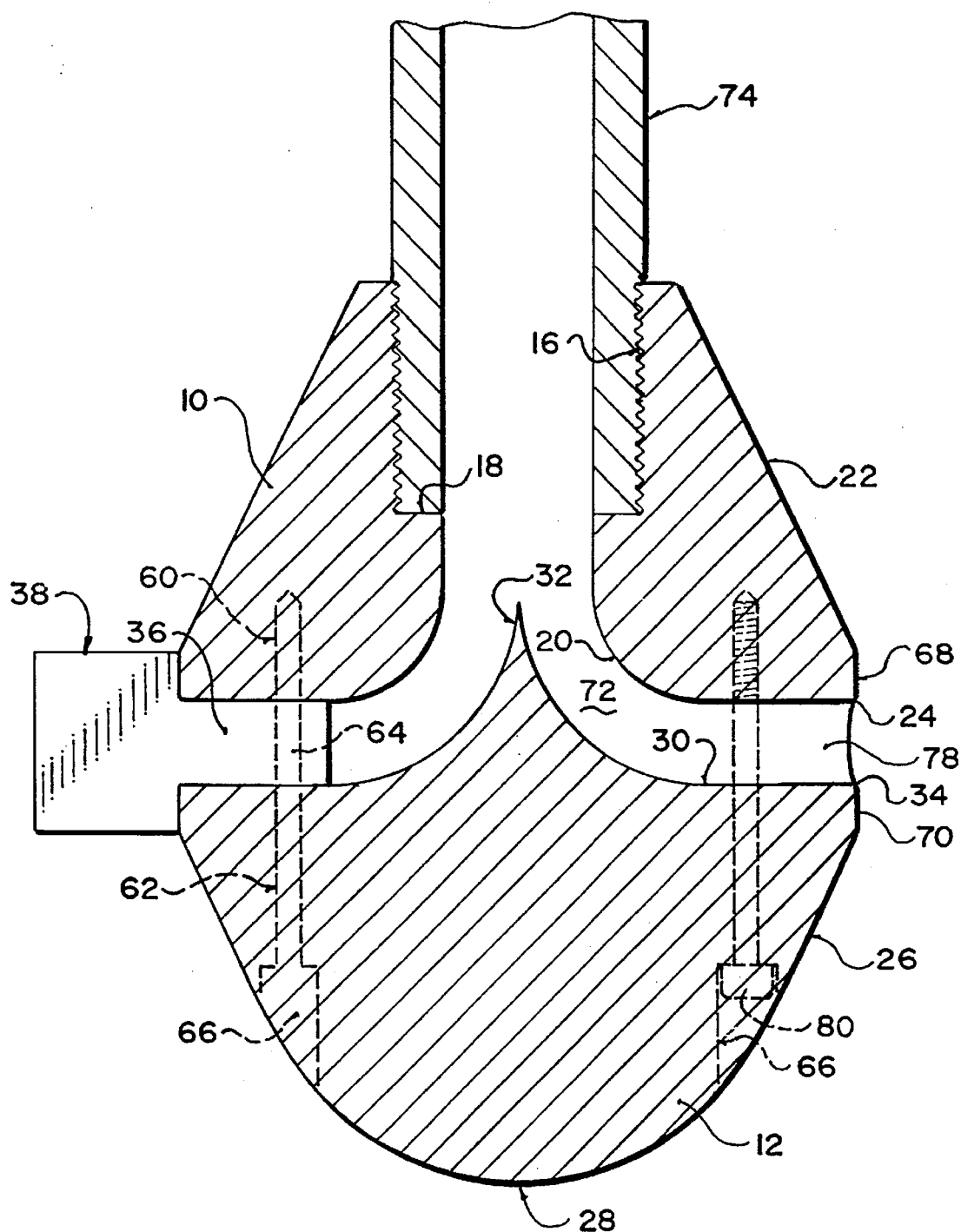
FIG. 4 is a vertical cross-section through the aerator with an air conduit attached, on the line 4—4 of FIG. 3.

Referring to FIG. 4, which shows the internal structure of the aerator, axial bore 16 has shoulder 18 therein. When the air tube 74 is threaded into the axial bore 16, the lower end of the air tube abuts against shoulder 18. Below shoulder 18, the inner wall 20 of upper body 10 tapers downwardly and outwardly, meeting rim 68 at circumferential edge 24 of the upper body.

Referring to FIGS. 1 and 4, the lower body 12 is generally radially symmetrical about its vertical axis. It has a circumferential rim 70, which has the same circumference as circumferential rim 68 of the upper body 10. Below rim 70, outer side wall 26 tapers inwardly in the downward direction, ending in rounded bottom end 28. The upper surface 30 of the lower body 12 has projection 32 in its centre and slopes downwardly and outwardly to meet rim 70 at circumferential edge 34.

Figure 3:
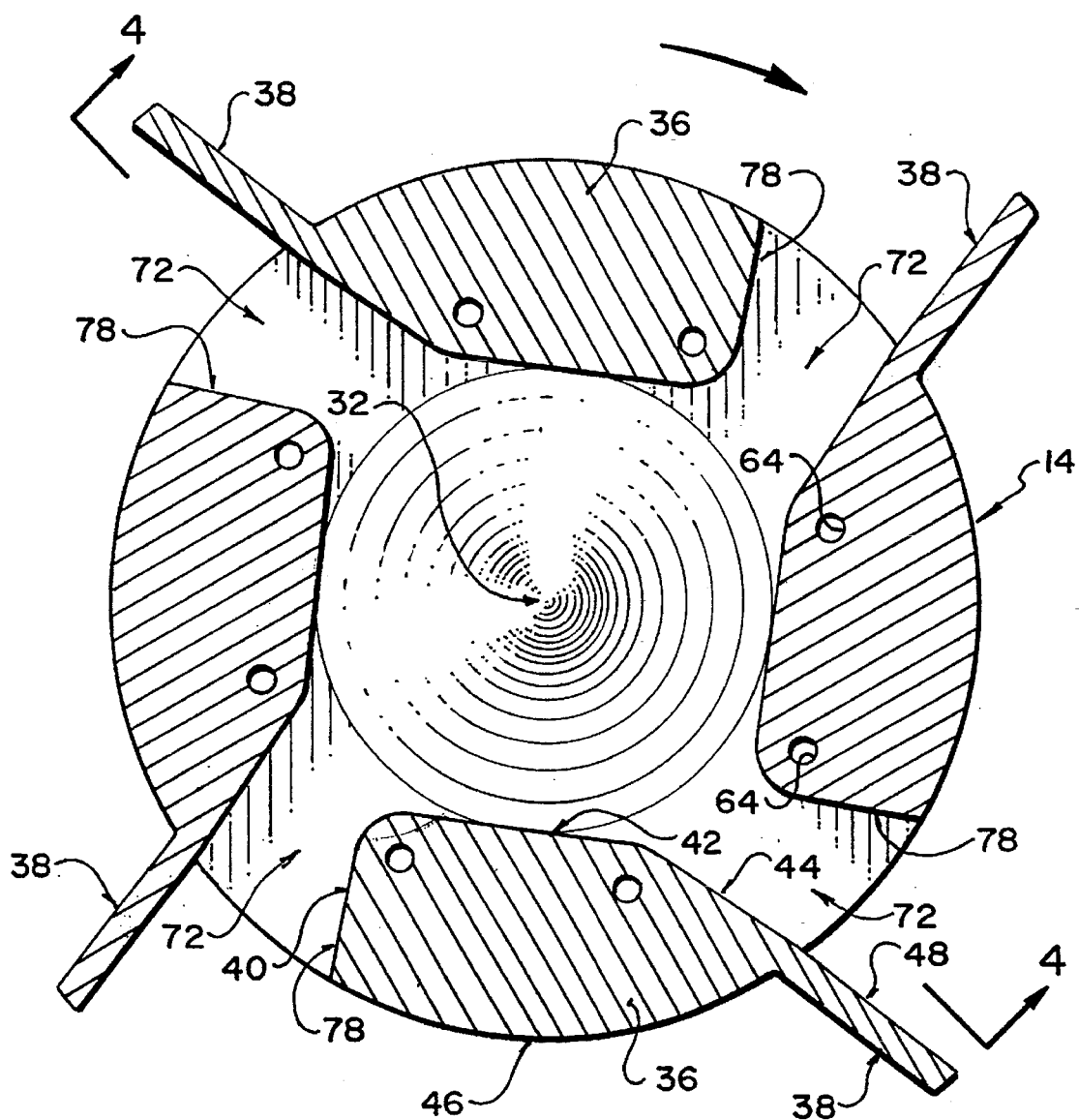
FIG. 3 is a horizontal cross-section on the line 3—3 of FIG. 1.

Referring to FIGS. 1 and 3, blade 14, of which there are four in the preferred embodiment, has a body portion 36 and a projecting portion 38. Body portion 36 has a forward edge 40, and inner edge 42, a rear edge 44 and an outer edge 46. The radius of curvature of the outer edge 46 is the same as that of rim 68 of upper body 10 and rim 70 of lower body 12. The outer edge 46 and rims 68 and 70 are therefore aligned, as best seen in FIG. 1. Projecting portion 38 of the blade 14 extends outwardly beyond outer edge 46 at the rear edge 44 of the blade 14. The trailing side 48 of the projecting portion 38 is contiguous with and in the same plane as rear edge 44. Projecting portion 38 is angled rearwardly at an angle of approximately 20.1°±1.5° with respect to a radius of the arc described by outer edge 46 of the blade body 36. The length of the blade body 36 along said arc, from the intersection of said arc with edge 40 to the intersection of said arc with projecting portion 38 is preferably 4.00±0.05 inches.

Projecting portion 38 has upper edge 50, lower edge 52, outer edge 54, and inner edges 56, 58. The height of projecting portion 38 is greater than that of body 36 so that the plane of upper edge 50 is aligned with the top of rim 68 and lower edge 52 is aligned with the bottom of rim 70. The length of projecting portion 38 from inner edges 56, 58 to outer edge 54 is preferably 1.688±0.125 inches.

Upper body 10, lower body 12 and blades 14 are assembled in the following manner. Referring to FIGS. 3 and 4, upper body 10 and lower body 12 each have eight vertical bores 60 and 62 respectively therein, and each of blades 14 have two bores 64 therein. Bores 60 are threaded to engage a bolt. Bores 62 open on the sides of lower body 12 at countersunk openings 66. When the upper and lower bodies and the blades are assembled, bores 60, 62, and 64 align with each other. Bolts 80 are inserted through opening 66 and extend through bores 62, 64 and 60, engaging the threads in bores 60, to securely attach the upper body, lower body and blades together, with the inner edges 56, 58 of the projecting portions 38 abutting rims 68 and 70 respectively.

The assembled aerator has air channels 72 formed between the inner wall 20 of the upper body 10 and the upper surface 30 of the lower body 12. Air channels 72 extend from axial bore 16 between the blades 14 and open at the sides of the aerator 8 between the blades 14 at air exit ports 78. The width of each air exit port 78, as measured along the arc described by rim 68 or 70, is preferably 1.5±0.05 inches.

Figure 2:
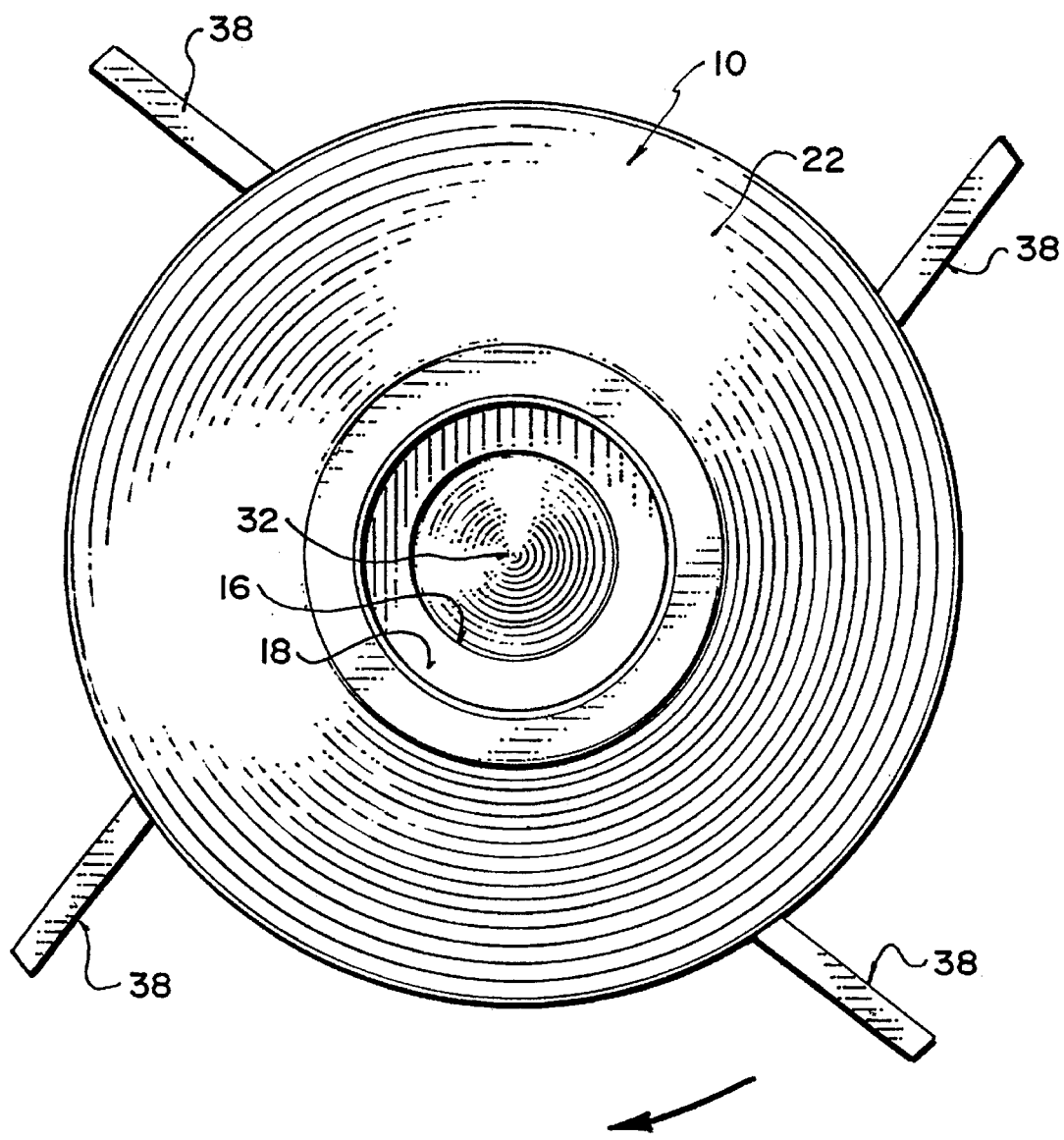
FIG. 2 is a top view of the aerator.

In use, the aerator is affixed to air tube 74 in a tank (not illustrated) in which an organic waste slurry is to be treated. The slurry preferably contains up to about 11% of solid organic matter. Within the tank, the air tube 74 extends downwards from the top of the tank, supported as required along its length, and holds the aerator near the bottom of the tank. The air tube is open to the atmosphere at its upper end above the surface of the slurry. The air tube 74 is rotated by conventional means, such as an electric motor positioned above the tank, rotating the aerator in the direction shown by the arrows in FIGS. 1, 2 and 3. The aerator is preferably rotated at about 1500 rpm for the 4-blade embodiment, resulting in a speed of rotation at the tips of the blades of about 69.5 feet/sec. The spinning causes a vacuum to be drawn down the axial bore 16 of the aerator, drawing air into the air tube through air channels 72 and expelling the air through air exit ports 78 and into the slurry as fine bubbles. In relatively deep tanks, for example where the depth of the slurry is over about twelve feet, it is preferable to have supplementary mixing of the slurry beyond that provided by the aerator, for example by means of rotating paddles.

Other preferred embodiments of the aerator have six blades or eight blades. The preferred dimensions for the blades, blade angle, exit port width and blade tip speed for such embodiments is the same as those set out above as preferred for the four-blade embodiment. To achieve the same blade tip speed, the speed of rotation for the six blade embodiment would accordingly be about 1000 rpm, and for the eight-blade embodiment about 750 rpm.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An aerator to be submerged in a liquid-solid slurry for introducing and dispersing air as fine bubbles in said slurry, comprising:

(a) a lower body;

(b) an upper body affixed to said lower body;

(c) said lower and upper bodies being generally circular in horizontal cross-section and being rotatable about a vertical axis;

(d) a plurality of blades disposed between said upper and lower bodies, said blades being spaced apart from each other, each of said blades comprising a body portion and a projecting portion, said body portion being positioned between said upper and lower bodies of said aerator and having a forward edge and a rearward edge with respect to the intended direction of rotation of said aerator, and an outer edge, said projecting portion projecting radially outwardly beyond the circumference of said upper and lower bodies and rearwardly with respect to the intended direction of rotation of said aerator, and being contiguous with the rearward edge of said body portion;

(e) said upper body having an axial bore to engage with an air tube which is open to the atmosphere at an intake end thereof, for conducting air into said aerator, said bore interconnecting with air exit ports between said blades;

(f) whereby when said aerator is submerged in said slurry and axially rotated by rotation of said air tube, said rotation of said aerator causes air to be drawn through said air tube into said aerator and ejected as fine bubbles into said slurry through said air exit ports, without intake of said slurry into said air exit ports.

2. An aerator according to claim 1 wherein said upper body is in the shape of an inverted, truncated cone.

3. An aerator according to claim 1 wherein said projecting portion is inclined rearwardly at an angle in the range of 20.1°±1.5° with respect to a radius of the arc described by said outer edge of said body of said blade.

4. An aerator according to claim 1 wherein the width of each of said gas exit conduits about the circumference of said aerator bodies is in the range of 1.5±0.05 inches.

5. An aerator according to claim 1 wherein the length of said body portion of said blades, measured along the arc described by said outer edge of said body portion between the intersection of said outer edge with said forward edge and the intersection of said outer edge with said projecting portion of said blade, is in the range of 4.00±0.05 inches.

6. An aerator according to claim 1 wherein the length of said projecting portion of said blades is in the range of 1.688±0.125 inches.

7. An aerator according to claim 1 wherein said liquid-solid slurry contains up to 11% solid organic matter.

8. An aerator according to claim 1 wherein said blades are removable and replaceable.

9. An aerator according to claim 8 comprising four of said blades.

10. An aerator according to claim 8 comprising six of said blades.

* * * * *